United States Patent [19]

Starceski et al.

[11] Patent Number: 4,937,675

[45] Date of Patent: Jun. 26, 1990

[54] REMOTE VIEWING APPARATUS

[75] Inventors: John D. Starceski, Pittsburgh; Richard E. Saul, Mars; John Trosiek, Jr., McClellandtown; Johnny J. Anderson, Gibsonia; Charles C. Moore, Hibbs, all of Pa.

[73] Assignee: Westinghouse Electric Corp., Pittsburgh, Pa.

[21] Appl. No.: 169,928

[22] Filed: Mar. 18, 1988

[51] Int. Cl.$^5$ .................... H04N 5/30; H04N 7/18
[52] U.S. Cl. ........................... 358/229; 358/108; 354/400
[58] Field of Search ............. 358/108, 229, 210, 227, 358/194.1; 354/288, 293, 195.11, 400; 352/242, 243

[56] References Cited

U.S. PATENT DOCUMENTS

| | | | |
|---|---|---|---|
| 3,399,614 | 9/1968 | Fischer | 358/229 |
| 3,437,753 | 4/1969 | Stith | 358/229 |
| 4,008,372 | 12/1977 | Cleno et al. | 358/229 |
| 4,222,540 | 9/1980 | King et al. | 352/243 |
| 4,233,634 | 11/1980 | Adams | 358/229 |
| 4,353,634 | 10/1982 | Hummelsbach | 354/400 |
| 4,420,238 | 12/1983 | Felix | 358/229 |
| 4,618,886 | 10/1986 | Mooney | 358/229 |
| 4,654,703 | 3/1987 | Viera | 358/229 |
| 4,731,669 | 3/1988 | Hayashi et al. | 358/229 |

OTHER PUBLICATIONS

Pelco Short Form Catalog CCTV Systems (Undated) p. 10, Model PT2001.

*Primary Examiner*—John K. Peng

[57] ABSTRACT

A pan and tilt apparatus for supporting a miniature television camera and an adjustable lens is disclosed. A lens support is hinged to the pan and tilt apparatus for rotation about an axis parallel to the central axis of the lens. The camera is supported by the lens when attached thereto. Parallel mounted drive trains in a drive housing operate the pan and tilt functions and endless slippable drives in the lens support are operative for providing powered lens adjustments.

19 Claims, 5 Drawing Sheets

4,937,675

REMOTE VIEWING APPARATUS

BACKGROUND OF THE INVENTION

The invention relates to a remote viewing apparatus having a miniature camera and an adjustable lens. In particular, the invention relates to remotely controllable means for directionally supporting and optically adjusting the camera and lens for remote viewing.

In certain applications, particularly in connection with the repair and maintenance of nuclear steam generators, a remote viewing capability is desirable. For example, there now exist means to provide surveillance within such steam generators while operations such as tube plugging, sleeving and cleaning are being performed. The devices which are presently used are heavy, bulky and require a relatively large amount of space in which to operate. As a result, such devices cannot be placed in certain areas of the steam generator where space is at a premium, such as near the tube sheet divider plate. This places a limitation on the effective viewing area of such devices, and thus, requires that they be repositioned often in order to fully view the area of interest. This is inconvenient, time consuming and expensive. Also, such devices may be jarred or dropped during repositioning, possibly resulting in damage.

Typically, presently available devices are mounted within the steam generator by means of a clamp specially designed for the particular pitch or spacing of the tubes in the steam generator. The clamp is sleeved into one or more steam generator tubes. Thus, different types steam generators require different clamps, which necessitates a greater inventory of customized parts and associated expense.

Presently available remote viewing devices are quite expensive and incorporate many different kinds of small parts. For example, many different sizes and shapes of fasteners are used to construct such devices. This means that a considerable inventory of various parts must necessarily be kept on hand and be readily available in the event that field repairs are necessary. Further, insasmuch as the devices contemplated herein are used in nuclear steam generators, it is expected that persons handling such equipment will be properly protected from radiation. In such situations, workers wear bulky protective clothing including multiple layers of gloves. Consequently, repair of currently available devices is quite difficult because the parts are small and difficult to handle. Thus, uniformity in the type and size of fasteners is desirable.

Field replacement of major components of presently available systems is also difficult and tedious work. For example, it is often very difficult to simply remove the lens from the camera or to remove the camera and lens from their supporting platform. Often a significant disassembly of component parts is necessary before major components may be interchanged. The difficulty of the various assembly and disassembly steps is further aggravated in a nuclear environment because of the requirement for workers to wear protective clothing.

Another problem associated with the use of any equipment in a nuclear environment is that the equipment sometimes becomes irradiated. Thus, bench repairs are often not practical. If the equipment fails, it is simply discarded and replaced at considerable cost.

Presently available systems typically use heavy and bulky cameras and remote controls. Often the weakest part of a camera is the so-called C-mount between the lens and the camera body. When jarred or dropped, the C-mount is usually the first part to break, causing irrepairable damage to the camera. Also, the lens may fall away and become damaged.

Remote viewing equipment of the type described usually includes means for adjusting the focus, zoom and aperture of the lens. These functions require separate controls which are normally built into the camera. These features, when incorporated into a camera, add considerably to its initial cost. Add-on equipment is available, but it is expensive and heavy. In either case, the cost and the weight of the equipment is considerable. Often, equipment useful for focusing or zooming the camera lens is specially designed by the manufacturer and is sometimes only compatible with cameras or lenses produced by that particular manufacturer. Thus, parts inventory is not uniform. The equipment useful for zoom, focus and aperture control employs mechanical stops and limiting devices which add to the weight cost and complexity of the equipment. Such devices, however, can be overdriven and the lens adjustment may be destroyed.

SUMMARY OF THE INVENTION

A miniature remotely operable optical viewing apparatus, including a camera and a lens with at least one adjustment comprises apparatus for directionally supporting and optically adjusting the camera and lens for remote viewing. The apparatus includes a drive housing, a tilt platform for carrying the camera mounted to the drive housing movable about a tilt axis, and a pan base attached to the drive housing movable about a pan axis. The tilt platform is movable about the tilt axis through a first angle at least 90 degrees, and the pan base is rotatable relative to the drive housing about the pan axis through a second angle greater than about 350 degrees. The pan axis is perpendicular to the tilt axis. A plurality of housing drive means are mounted in the drive housing, including a tilt drive means coupled to the tilt platform for driving the tilt platform through said first angle, and a pan drive means coupled to the pan base for driving said pan base through said second angle. A lens support means is hinged to the tilt platform about an axis parallel to a central axis of the lens for supporting the lens therein. In an exemplary embodiment, the lens support includes at least three slippable drives coupled to the lens adjustment for driving the lens adjustment between extreme positions and slipping at said extreme positions so as not to overdrive and damage the lens adjustment.

According to another aspect of the present invention a pan and tilt apparatus for supporting a miniature television camera and an adjustable lens as disclosed. A lens support is hinged to the pan and tilt apparatus for rotation about an axis parallel to the central axis of the lens. The camera is supported by the lens when attached thereto. Parallel mounted drive trains in a drive housing operate the pan and tilt functions and endless slippable drives in the lens support are operative for providing powered lens adjustments.

DESCRIPTION OF THE PREFERRED EMBODIMENT

Figure 1:
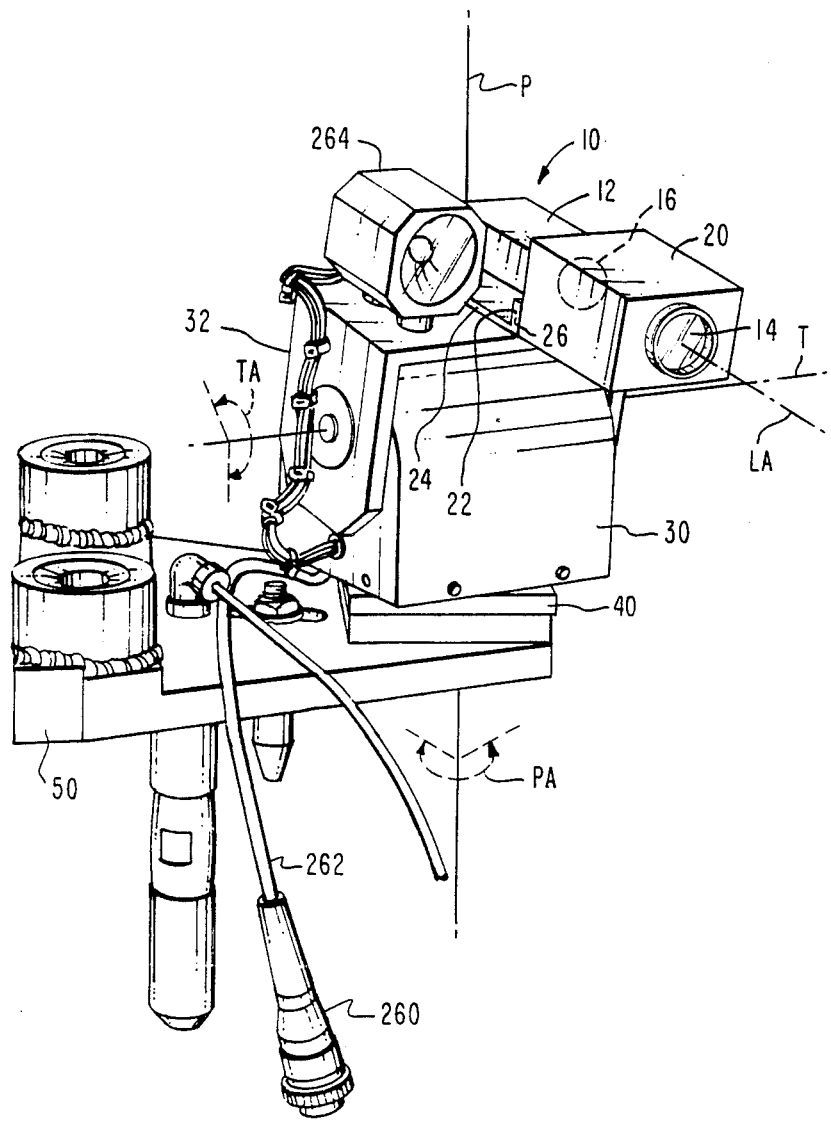
FIG. 1 is a front perspective view of apparatus according to the present invention.

FIG. 1 is a front perspective view of a miniature remotely operable optical viewing apparatus 10 in accordance with the present invention. The apparatus 10 has a miniature camera 12 and an adjustable lens 14 attached to the camera 12 by means of camera mount or C-mount 16. The lens 14 is secured within a lens housing 20 along its lens axis LA. An adapter plate 22 having a base portion 24 and a hinge portion 26 is secured to the lens housing 20.

A drive housing 30 supports internally located drive means which will be described hereinafter. A tilt platform 32 is rotatably secured to the drive housing about a tilt axis T. The adapter plate 22 is attached to the tilt platform 32. The tilt platform 32 is adapted to move through a tilt angle TA which is at least about 90 degrees. A pan base 40 is rotatably attached to the drive housing 30 about a pan axis P. The pan base 40 rotates relative to the drive housing 30 through a pan angle PA which is at least about 350 degrees. A cam lock 50 is secured to the pan base 40. In operation, the cam lock 50 is secured in a tube of a steam generator on the tube sheet side (not shown).

The apparatus 10 is compact in size and can be located in confined areas. The large tilt angle TA and pan angle PA allows a significant observable area available for viewing by the camera 12 through a solid viewing angle of about 90×350 degrees. These features reduce the necessity to frequently reposition the apparatus 10 in order to adequately view an area of interest.

Where possible, allen screws are used as fasteners in the present invention. Allen screws may be readily handled by mechanics wearing protective gloves and only a few sizes are necessary to assemble the apparatus 10.

Figure 2:
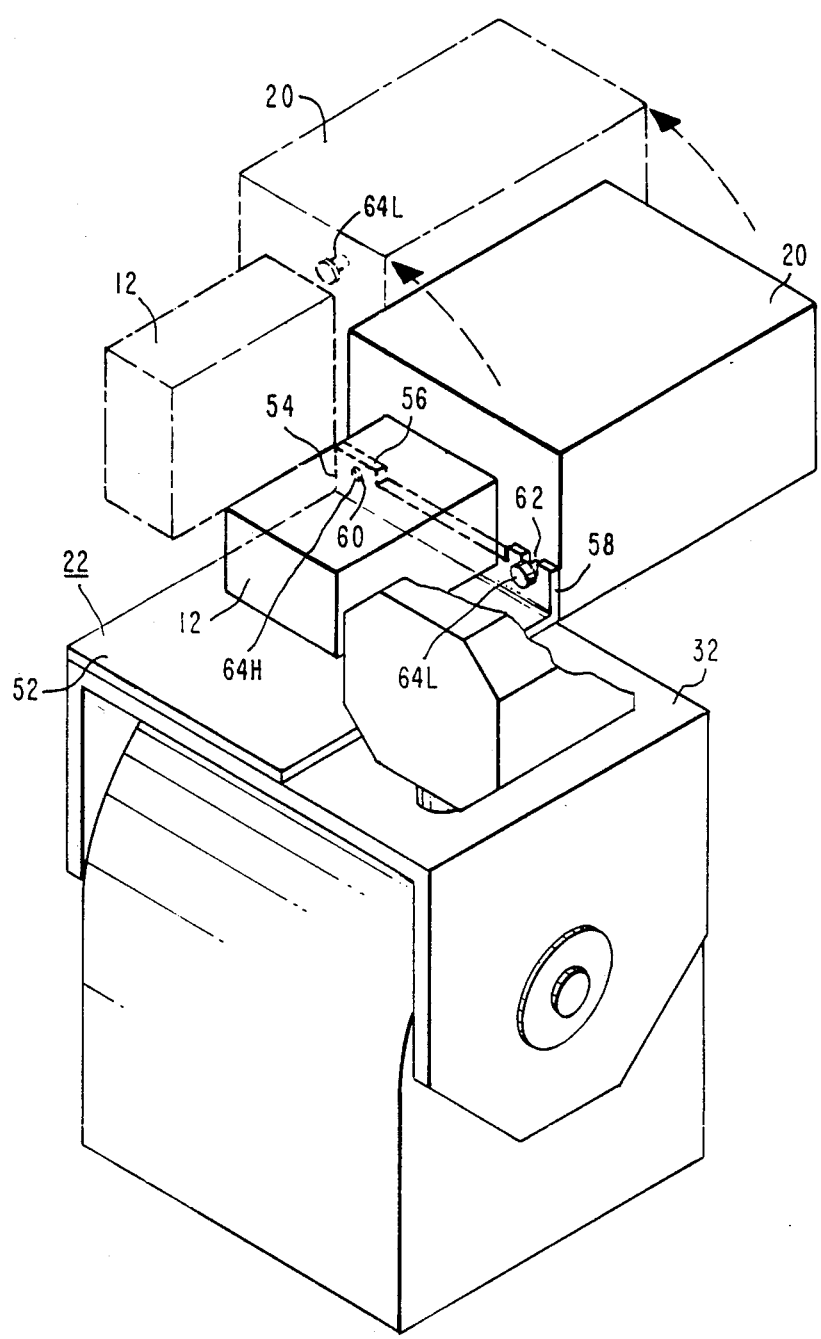
FIG. 2 is a rear perspective view of a portion of the apparatus shown in FIG. 1 in which the lens support and camera are shown rotated to about a hinge axis in phantom.

FIG. 2 is a rear perspective view of a portion of the apparatus illustrated in FIG. 1 featuring the adapter plate 22 with the lens housing 20 secured thereto. The adapter plate 22 is formed of an "L" shaped member having an elongated side 52 adapated to be secured to the tilt platform 32 and a short upstanding end 54 adapted to support the lens housing 20. The upstanding end 54 is formed with an apertured hinge tab 56 and a slotted locking tab 58. The hinge tab 56 has an aperture 60 therethrough and the locking tab 58 has a slot 62. A hinge pin 64H is threadably secured to the lens housing 20 parallel with the lens axis LA through the aperture 60 in the hinge tab 56. Hinge pin 64H is an allen screw. Locking pin 64L (also an allen screw 64) is threadably secured to the lens housing 20. Locking pin 64L is adapted to engage the slot 62 so that the lens housing 20 may be rotated about the hinge pin 64H. When the locking pin 64L is engaged in the slot 62 and tightened, the lens housing 20 is secured to the adapter plate 22 as shown in solid lines.

In arrangement illustrated in FIG. 2, if the camera 12 becomes damaged, a mechanic may easily loosen the locking pin 64L and rotatably move the lens housing 20 and the camera 12 about the hinge pin 68H away from the adapter plate 22, as shown in phantom. The camera 12 may thus be easily removed and replaced because of the added hand clearance provided by the rotation of the camera 12 out of the way of the adapter plate 22.

Figure 3:
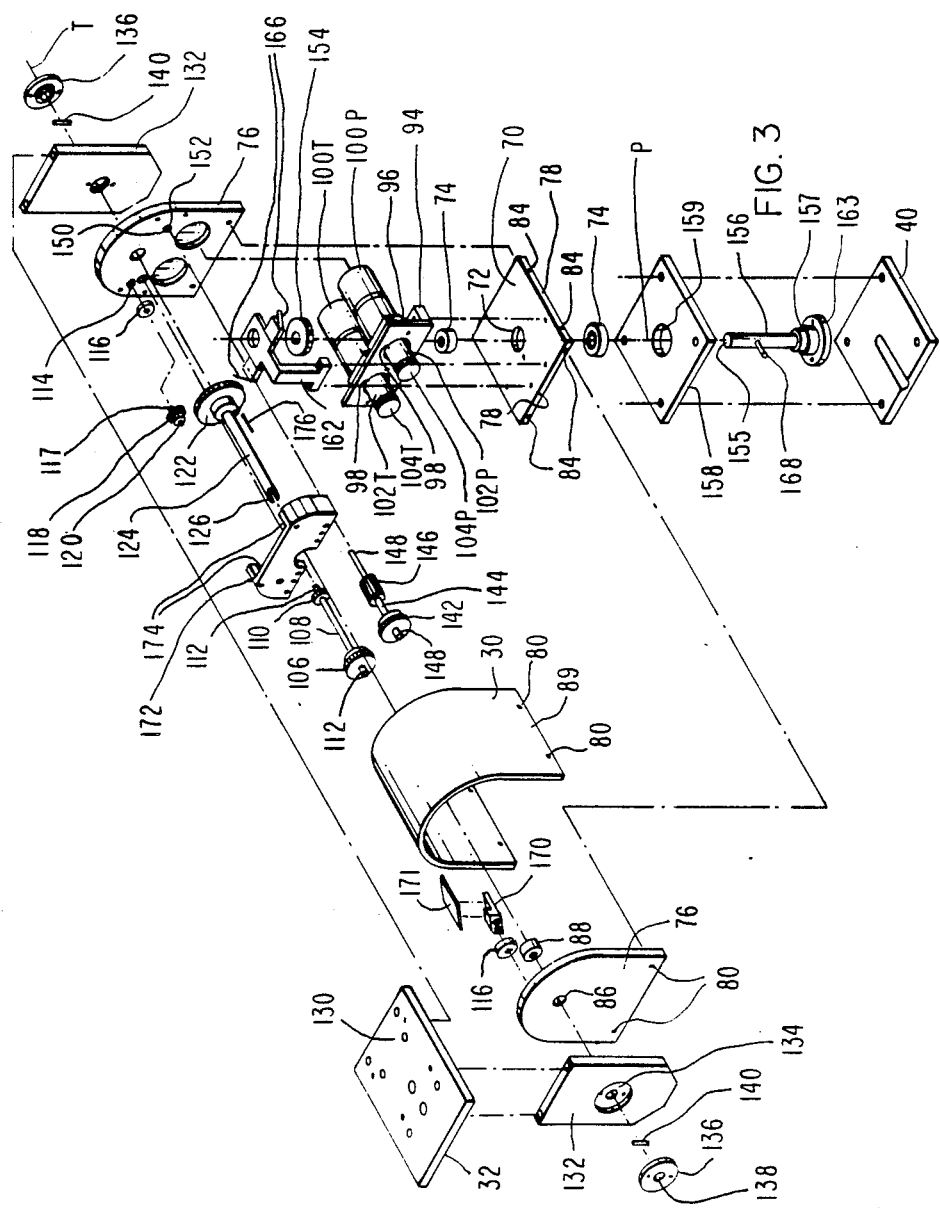
FIG. 3 is an exploded view of a portion of apparatus shown in FIG. 1 including a pan and a tilt assembly.

The drive housing 30, the tilt platform 32 and the pan base 40 are illustrated in the exploded perspective view of FIG. 3. The drive housing 30 includes a lower wall 70 having a central aperture 72 and a bearing 74 sleeved therein. The drive housing 30 further includes upstanding arcuate side walls 76 which are adapted to be secured to the lower wall 70 in abutting relation with opposite sides 78 thereof. Each side wall 76 is secured to lower wall 70 by means of allen screws (not shown but similar to the allen screws shown and described in FIG. 2) passing through apertures 80 in side wall 76 and engaging threaded bores 84 in lower walls 70. The side wall 76 includes lateral, axially aligned apertures 86 each having a bearing 88 therein. The central aperture 72 in the lower wall 70 is aligned with the pan axis P, and the lateral apertures 86 in the side walls 82 are aligned with the tilt axis T. An arcuate cover 89 formed of a bent rectangular sheet metal member conforms with the arcuate side walls 76, as shown, and is similarly attached to the lower wall 70 by means of allen screws (not shown) passing through apertures 80 and engaging threaded bores 84 in the lower wall 70.

A motor mount 94 is secured to the lower wall 70, as shown. The motor mount 94 has an upstanding leg 96 having a pair of motor drive apertures 98 therein in parallel axial alignment. A pan motor 100P and a tilt motor 100T are secured to the upstanding leg 98. The pan motor 100P and the tilt motor 100T may be VICON VT2000PTDC 9 volt DC motors. The pan motor 100P and the tilt motor 100T each have a respective output shaft 102P and 102T and a respective gear head 104P and 104T. The gear head 104T of the tilt motor 100T drives a gear train including a spur gear 106 secured to a pinion shaft 108 which has a pinion gear 110 integrally formed therewith. Opposite ends 112 of the pinion shaft 108 are secured in apertures 114 in the side walls 76. Apertures 114 have bearings 116 pressed therein. The pinion gear 110 drives a dual cluster gear set 117 including a first gear 118 and a second smaller gear 120. The pinion 110 engages gear 118. The smaller gear 120 engages a drive gear 122. A slotted shaft 124 supporting the drive gear 122 has slotted ends 126 which extend through the lateral apertures 86 in the side walls 76. When the tilt motor 100T is energized, the drive shaft 124 rotates either clockwise or counter-clockwise depending upon the polarity of the input voltage.

The tilt platform 32 includes an upper wall 130 which supports the adapter plate 22 (FIGS. 1 and 2). The tilt platform 32 also includes depending side walls 132 which are attached to the underside of upper wall 130 by allen screws (not shown). Each of the depending side walls 132 includes a drive shaft aperture 134 which is aligned with the tilt axis T, as shown, for receiving the slotted ends 126 of the drive shaft 124 therein. An apertured disc 136 having a central aperture 138 and a diametric pin 140 is secured in a counterbore 142 formed in each depending side wall 132 of the tilt platform 32. The central aperture 138 of the disc 136 is aligned with the shaft aperture 134 of the side walls 132. The slotted end 126 of the drive shaft 124 is keyed into the central aperture 138 and diametric pin 140 so that when the drive shaft 124 rotates the tilt platform 32 may thereby be moved.

The pan motor 100P and the corresponding pan gear head 104P drives a gear train which includes a spur gear 142 mounted on a drive shaft 144 which carries a worm gear 146. Ends 148 of the drive shaft 144 are located in corresponding apertures 150 in the side walls 76 which have bearings 152 therein. All bearings noted herein may be oil impregnated bronze bushings sold under the trade name OILITE. The worm gear 146 engages a worm wheel 154 mounted to the upper end 155 of a pan drive shaft 156. The lower end 157 of the pan drive shaft 156 is attached to a flange 163. The flange 163 is located in an aperture 159 of aperture plate 158 which is secured to pan base 40. The pan drive shaft 156 is aligned with the pan axis P and passes through the aperture 72 and bearing 74 in the lower wall 70 of the drive housing 30. When the pan motor 100P is energized, depending upon the polarity of the input voltage, the drive housing 30 and pan base 40 rotate relative to each other.

A limit switch bracket 162 having an aperture 164 therein is secured to the lower wall 70 of the drive housing 30. The pan drive shaft 156 passes through the aperture 164 in the limit switch bracket 162. Limit switches 166 are laterally mounted on either side of the limit switch bracket 162 as shown. An actuator 168 in the form of a pin is secured to the pan drive shaft 156 and engages the limit switches 166 through a pan angle PA of about 350 degrees as shown. As the pan base 40 and drive housing 30 move relative to each other, the actuator 168 engages one or the other of the limit switches 166 at the extremes of the relative motion of the parts.

A tilt limit switch bracket 172 carries a pair of limit switches 174. An actuator 176 in the form of a pin on the tilt drive gear 122 engages the tilt limit switches 174 at the extremes of motion through a tilt angle TA of about 90 degrees. In accordance with the present invention, therefore, the combined pan angle PA and tilt angle TA allows operation of the drive housing 20 through a significant solid angle of about 90×350 degrees.

A circuit board mount 170 is secured to one of the side walls 76 as shown. The circuit board mount 170 supports an electrical circuit board 171 which includes a rectifier circuit (not shown) for changing incoming alternating current to an appropriate DC level. Such a circuit may include a half wave bridge rectifier (not shown) for each of the pan motor 100P and the tilt motor 100T.

Figure 4:
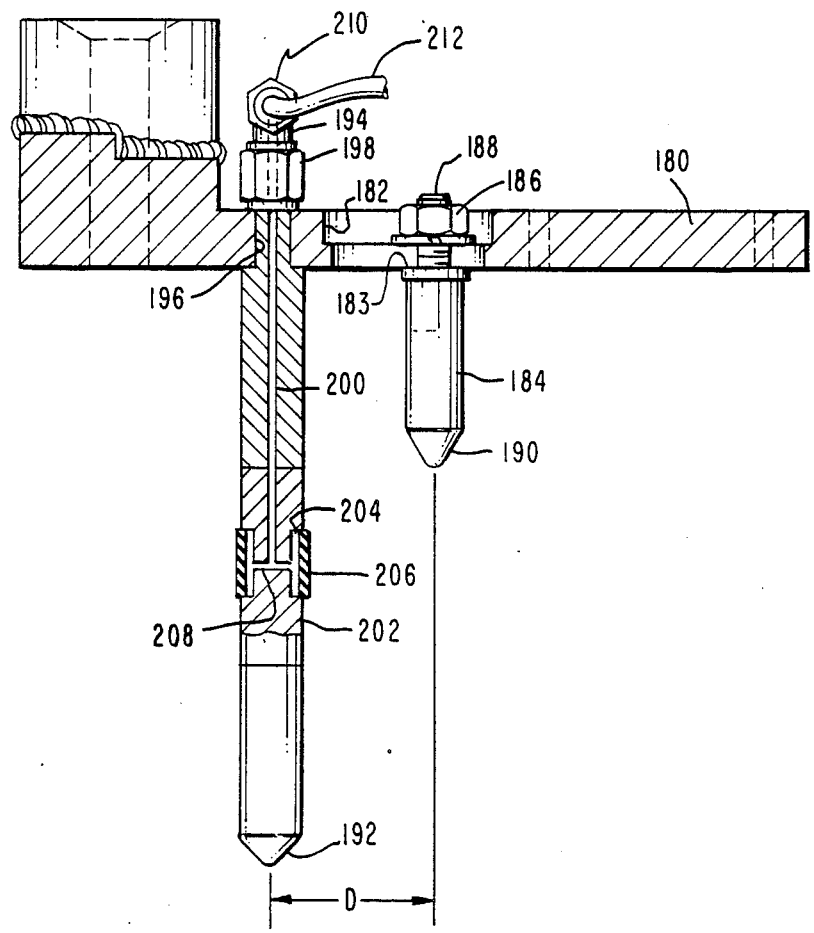
FIG. 4 is a perspective view of an adjustable cam lock assembly for supporting the apparatus in a tube sheet of a steam generator.

The cam lock 50 of the present invention, shown in FIGS. 1 and 4, is adapted to support the drive housing 30. In the embodiment shown in FIG. 4, the cam lock 50 is adapted to engage the inside of a tube through the open side of a tube sheet in a steam generator (not shown). The cam lock 50 includes a pan base adapter 180 having an elongated adjustment slot 182 therein. An alignment pin 184 extends away from the pan base adapter 180. The alignment pin 184 is secured in the adjustment slot 182 by means of a ledge face 183 abutting one side of the adapter 180 and threaded adjustment locking nut 186 threaded to the proximate end 188 of the alignment pin 184 and abutting the other side of the adapter 180. The alignment pin 184 has a tapered distal end 190 and is dimensioned to fit within the open end of a tube secured in a tube sheet of a steam generator (not shown). The position of the alignment pin 184 may be adjustably located and locked into position anywhere in the adjustment slot 182 as desired.

An inflatable bladder lock 192 is secured to the pan base adapter 180 in parallel relationship with the alignment pin 184. A threaded proximate end 194 of the inflatable bladder lock 192 is secured in an aperture 196 in the pan base adapter 180 by means of a nut 198. The inflatable bladder lock 192 has a central aperture 200 therein. The outer wall 202 of the inflatable bladder lock 192 has a circumferential slot 204 formed therein. An inflatable bladder 206 is secured in the slot 204 and communicates with the central aperture 200 by means of radial apertures 208, as shown. A remotely actuable valve 210, in flow communication with the central aperture 200, is secured to the proximate end 194 of the inflatable bladder lock 192. An air line 212 is coupled to the valve 210 and to a suitable source of pressurized air (not shown). When the valve 210 is actuated, air is supplied to the inflatable bladder 206 through the central aperture 200 and the radial apertures 208 so that the inflatable bladder 206 expands. When the inflatable bladder lock 192 is placed within the tube of the steam generator and air is supplied to the inflatable bladder 206, as described, the inflatable bladder 206 expands against the side walls of the tube and secures the inflatable bladder lock 192 therein. In operation, the cam lock 50 is placed in the steam generator with the pin 184 and inflatable bladder lock 192 facing the tube sheet. The cam lock 50 is mated with the tube sheet by insertion of the pin 184 and the inflatable bladder lock 192 in spaced tubes. The inflatable bladder lock 192, when actuated, secures the cam lock 50 in place and the alignment pin 182 stabilizes the cam lock 50 in position.

The pitch or spacing between tubes in various steam generators is usually different. Thus, the alignment pin 184 is adjustably positioned relative to the inflatable bladder lock 192 by a distance D which represents the particular spacing or pitch distance of the tubes in the steam generator into which the device will be installed. The cam lock 50 is thereby adapated to securely and stably support the drive apparatus 10 in place within the steam generator.

Figure 5:
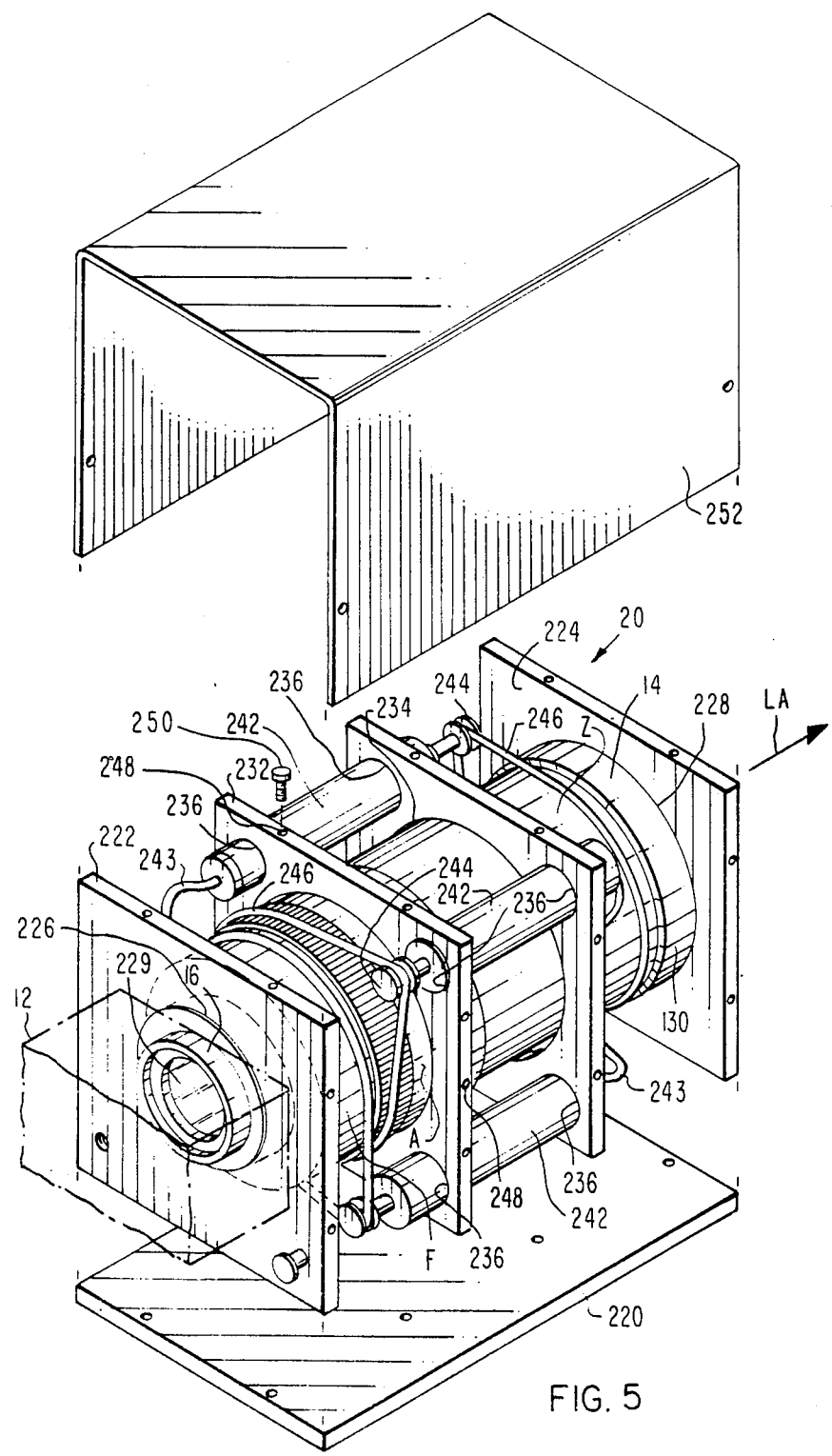
FIG. 5 is an exploded perspective view of a lens housing according to the present invention.

The lens housing 20 according to the present invention is illustrated in the exploded perspective view of FIG. 5. The lens housing 20 is adapted to support a lens 14 securely therein and includes means for driving adjustable elements of the lens 14 between extreme positions without damaging such adjustable elements. For example, the lens 14 may include a zoom adjustment Z, an aperture adjustment A and a focus adjustment F. The various adjustments are known sleeve-like members which are sleeved to the body of the lens 14. Relative motion of each of the adjustments Z, A and F with respect to the body of the lens 14 cause a change in the corresponding adjustment in a manner well known in the art.

The lens housing 20 includes a lower wall 220, an upstanding proximal end wall 222 and an upstanding viewing end wall 224. The proximal end wall 222 has a central aperture 226 which is dimensioned to allow the corresponding end 229 of the lens 14 to pass therethrough for engagement with the C-mount 16 of the camera 12 (FIG. 1). The viewing end wall 224 has a central aperture 228 therein which is dimensioned for allowing a front or viewing end 130 of the lens 14 to pass therethrough. A pair of upstanding parallel intermediate motor supporting walls 232 having central apertures 234 are mounted to the lower wall 220 between the proximal end wall 222 and a viewing end wall 224. The central apertures 226, 228 and 234 are sufficiently large so that the lens 14 may be removed from the lens housing 20 from the viewing end wall 224 in the direction indicated by the arrowhead on the lens axis LA.

The motor supporting walls 232 include a plurality of pairs of axially aligned motor offset apertures 236 which are located, as shown, adjacent the central apertures 234 therein. Miniature DC motors 242 such as MicroMo 9 V DC, each having a drive pulley 244 mounted to the output end thereof are located, one each, in a respective one of the pairs of motor apertures 236, as shown. A pulley 244 on each motor 242 is located adjacent a corresponding one of the adjustments Z, A and F. An O-ring belt 246 for each motor 242 engages a respective pulley 244 and one respective adjustment Z, A and F. Rotation of each motor 242 causes rotation of one of the corresponding adjustments Z, A and F by means of the O-ring belt. The O-ring belts 246, are adapted to slip relative to the adjustments Z, A and F whenever the corresponding adjustment reaches a limit position. Such slippage prevents damage to the adjustments of the lens 14. In this way, further motion-limiting means are not required and damage to the lens 14 is virtually precluded.

Each of the motor apertures 236 has at least one radially threaded aperture 248 for receiving an allen screw 250. The allen screw 250 radially engages the motor to secure each one in its corresponding motor aperture 236, as shown.

The lens housing 20 also includes a sheet metal cover 252 which is secured to the lower wall 220 and to the proximal and viewing end walls 222 and 224, respectively, by means of allen screws 248 engaging threaded apertures 250 therein. One or more of the central apertures 226, 228 and 234 may also have a radially treaded aperture 248 for receiving an allen screw to thereby secure the lens 14 in the lens housing.

The motors 242 have electrical power leads 243. In this connection, reference is directed to the multiple pin connector 260 (FIG. 1) and cable 262 which is a standardized device coupled to and having a sufficient number of pins (not shown) for carrying power and control signals to each of the pan and tilt drive motors 100P, 100T and the lens adjustment motors 242 and a sound feature for the camera 14, if desired. A remote lighting device 264 (FIG. 1) may be provided and powered through cable 262 and pin connector 260.

The apparatus of the present invention is constructed with virtually all metal parts and without plastic or nylon gearing. Despite the fact that metal parts are used virtually throughout the apparatus 10 of the present invention, the overall size and weight is about 10 percent of conventional devices. Thus, it is easy to handle and manipulate. The apparatus of the present invention is significantly more rugged than currently available devices for remote viewing. Further, the cost of the apparatus of the present invention is about half that of currently available equipment. The components have been fabricated, as much as possible, with uniform-size allen screws and high-strength aluminum components so that the inventory necessary for making field repairs is significantly reduced.

The following are some exemplary parameters showing speeds and materials in an embodiment of the invention.

Pan Motor (100P) Vicon, VT 2000PT
9 VDC
45 RPM (Shaft)
0.833 RPM Final Drive
Tilt Motor (100P) (Same as Pan Motor)
0.550 RPM Final Drive
Pan Drive Train: 1.12 RPM At Drive Shaft 156
Tilt Drive Train: 1.15 RPM At Slotted Shaft 124
Lens Adjustment Motors:
  Micro MO 1212 E 006G
  9 VDC
  529: 1 Gear Head
Drive Housing: All Aluminum T-6061-T2 Durable Grade
Bearings: OILITE, Oil Impregnated Bronze
Pan Angle: PA 350°
Tilt Angle: TA 90°
Field Of View Solid Angle 90×350°

While the invention has been described in connection with specific embodiments thereof, it will be understood that it is capable of further modifications. The claims are intended to cover any variations, uses or adaptations of the invention following, in general, the principles of the invention, and including such departures from the present disclosure as come within known and customary practice within the art to which the invention pertains.

I claim as my invention:

1. A remotely operable optical viewing apparatus, including a lens having rotatable adjustments, a camera attachable to the lens, and means for directionally supporting and optically adjusting the camera and lens for remote viewing said supporting and adjusting means comprising:
   a drive housing;
   a tilt platform mounted to the drive housing for rotation about a tilt axis, said tilt platform being tiltable about the tilt axis through a first angle of at least 90 degrees;
   a pan base mounted to the drive housing for rotation about a pan axis perpendicular to the tilt axis, said pan base being rotatable relative to the drive housing about the pan axis through a second angle of at least 350 degrees;
   a plurality of housing drives mounted in the drive housing, including a tilt drive means coupled to the tilt platform for driving the tilt platform through said first angle and a pan drive means coupled to the pan base for driving said pan base through said second angle; and
   a lens support for supporting the lens therein, said lens support being hinged to the tilt platform for rotation of the lens and the camera when attached thereto into and out of an operating position about an axis parallel to the central axis of the lens, said lens support including at least one endless slippable drive coupled to each lens adjustment for rotatably driving the lens adjustment between extreme positions and slipping at said extreme positions so as not to overdrive and damage the lens adjustments.

2. The apparatus of claim 1 wherein the tilt drive comprises:
   a tilt motor mounted parallel to the tilt axis and a tilt gear train driven by said tilt motor mounted parallel to the tilt axis;
   a tilt drive shaft driven by the tilt gear train mounted in the housing and extending through apertures therein into engagement with the tilt platform; and an internal tilt angle limiter responsively coupled to the tilt drive shaft for deenergizing the tilt motor at extreme ends of the tilt platform rotation.

3. The apparatus of claim 2 wherein the tilt drive shaft includes slotted end portions, and the tilt platform includes mating portions keyed to the slotted portions of the tilt drive shaft.

4. The apparatus of claim 1 wherein the pan drive comprises:
a DC pan motor mounted parallel to the tilt axis and a pan gear train including a driving worm gear mounted parallel to the tilt axis;
a pan drive shaft secured to the pan base perpendicular to the tilt axis and a driven worm drive gear mounted on the pan drive shaft engaging the driving worm gear; and
an internal pan angle limiter responsively coupled to the pan drive shaft for deenergizing the pan motor at extreme ends of the pan rotation.

5. The apparatus of claim 1 wherein the lens has multiple adjustments including zoom, focus and aperture relatively movable about a central axis of the lens, and the slippable drive includes a motor mounted parallel to the lens for each adjustment, each motor having a drive end and a pulley located axially adjacent the corresponding adjustment, and an O-ring drive belt for engaging the pulley and the corresponding adjustment for driving the adjustment between extreme positions, the pulley allowing the O-ring belt to slip relative to the adjustment for preventing damage to the lens adjustments.

6. The apparatus of claim 5 wherein the lens support includes:
a plurality of spaced parallel apertured walls aligned with the central axis of the lens for receiving the lens therein, and
a plurality of axially aligned pairs of apertures offset from the central axis of the lens for receiving the respective lens drive motors, at least one of each pair of apertures having a radially threaded opening therein and a locking screw threaded into the threaded opening for securing the motor therein.

7. The apparatus of claim 1 further including an adapter plate comprising: a tilt platform engaging portion and an upstanding hinge portion, the hinge portion including a pair of tabs, one of said tabs having an aperture therein and the other tab having a slot therein, a hinge pin engaging the aperture and the lens support for supporting the lens support for rotation relative to the adapter plate, and a threaded locking pin engaging the lens support remotely from the hinge pin for engaging a slot and allowing the lens support to move into and out of the slot and locking the lens support therein by threading the locking pin.

8. The apparatus of claim 1 further comprising:
a cam lock adapted to engage the pan base, said cam lock including an inflatable bladder lock extending therefrom and an adjustable alignment pin in parallel relationship with the inflatable bladder lock being in adjustable spaced relation therewith; and
means for locking the adjustable alignment pin in position with respect to the inflatable bladder lock at a desired distance therebetween.

9. The apparatus of claim 8, wherein the inflatable bladder lock is adapted to be located in a tube and said bladder lock has a central opening therein and further comprising a bladder secured thereto in flow communication with the central opening, and an air valve coupled to a source of air in flow communication with the central aperture for regulating the flow of air to the bladder, the bladder expanding upon introduction of air for engagement with the tube for securing the cam lock in position.

10. A remotely operable optical viewing apparatus, including a lens having rotatable adjustments, a camera attachable to the lens and means for directionally supporting and optically adjusting the camera and lens for remote viewing said supporting and adjusting means comprising:
a drive housing;
a tilt platform mounted to the drive housing for rotation about a tilt axis, said tilt platform being tiltable about the tilt axis through a first angle of at least 90 degrees;
a pan base mounted to the drive housing for rotation about a pan axis perpendicular to the tilt axis, said pan base being rotatable relative to the drive housing about the pan axis through a second angle of at least 350 degrees;
a plurality of housing drives mounted in the drive housing, including a tilt drive means coupled to the tilt platform for driving the tilt platform through said first angle including a tilt motor mounted parallel to the tilt axis, a tilt gear train driven by said tilt motor mounted parallel to the tilt axis and a tilt drive shaft driven by the tilt gear train mounted in the housing, said tilt drive shaft having slotted end portions extending through apertures in the housing for engagement with corresponding mating portions of the tilt platform keyed to the slotted portions of the tilt drive shaft, and an internal tilt angle limiter responsively coupled to the tilt drive shaft for deenergizing the tilt motor at extreme ends of the tilt platform rotation through said angle and a pan drive means coupled to the pan base for driving said pan base through said second angle; and
a lens support for supporting the lens therein, said lens support being hinged to the tilt platform for rotation of the lens and the camera when attached thereto into and out of an operating position about an axis parallel to the central axis of the lens and camera, said lens support including at least one endless slippable drive coupled to each lens adjustment for rotatably driving the lens adjustment between extreme positions and slipping at said extreme positions so as not to overdrive and damage the lens adjustments.

11. A remotely operable support for a lens having rotatable adjustments and a camera attachable thereto comprising:
a drive housing;
a tilt platform mounted to the drive housing for rotation about a tilt axis, said tilt platform being tiltable about the tilt axis through a first angle;
a pan base mounted to the drive housing for rotation about a pan axis perpendicular to the tilt axis, said pan base being rotatable relative to the drive housing about the pan axis through a second angle; P1 a plurality of housing drives mounted in the drive housing, including a tilt drive means coupled to the tilt platform for driving the tilt platform through said first angle and a pan drive means coupled to the pan base for driving said pan base through said second angle; and a lens support for supporting the lens therein, said lens support being hinged to the tilt platform for rotation of the lens and the camera when attached thereto into and out of an operating position about an axis parallel to the central axis of the lens, said lens support including at least one endless slippable drive coupled to each lens adjustment for rotatably driving the lens adjustment between extreme positions and slipping at said extreme positions so as not to overdrive and damage the lens adjustments.

12. The apparatus of claim 11 wherein the tilt drive comprises:
   a tilt motor mounted parallel to the tilt axis and a tilt gear train driven by said tilt motor mounted parallel to the tilt axis;
   a tilt drive shaft driven by the tilt gear train mounted in the housing and extending through apertures therein into engagement with the tilt platform; and
   an internal tilt angle limiter responsively coupled to the tilt drive shaft for deenergizing the tilt motor at extreme ends of the tilt platform rotation.

13. The apparatus of claim 12 wherein the tilt drive shaft includes slotted end portions, and the tilt platform includes mating portions keyed to the slotted portions of the tilt drive shaft.

14. The apparatus of claim 11 wherein the pan drive comprises:
   a DC pan motor mounted parallel to the tilt axis and a pan gear train including a driving worm gear mounted parallel to the tilt axis;
   a pan drive shaft secured to the pan base perpendicular to the tilt axis and a driven worm drive gear mounted on the pan drive shaft engaging the driving worm gear; and
   an internal pan angle limiter responsively coupled to the pan drive shaft for deenergizing the pan motor at extreme ends of the pan rotation.

15. The apparatus of claim 11 wherein the lens has multiple adjustments including zoom, focus and aperture relatively movable about a central axis of the lens, and the slippable drive includes a motor mounted parallel to the lens for each adjustment, each motor having a drive end and a pulley located axially adjacent the corresponding adjustment, and an O-ring drive belt for engaging the pulley and the corresponding adjustment for driving the adjustment between extreme positions, the pulley allowing the O-ring belt to slip relative to the adjustment for preventing damage to the lens adjustments.

16. The apparatus of claim 15 wherein the lens support includes:
   a plurality of spaced parallel apertured walls aligned with the central axis of the lens for receiving the lens therein, and
   a plurality of axially aligned pairs of apertures offset from the central axis of the lens for receiving the respective lens drive motors, at least one of each pair of apertures having a radially threaded opening therein and a locking screw threaded into the threaded opening for securing the motor therein.

17. The apparatus of claim 11 further including an adapter plate comprising: a tilt platform engaging portion and an upstanding hinge portion, the hinge portion including a pair of tabs, one of said tabs having an aperture therein and the other tab having a slot therein, a hinge pin engaging the aperture and the lens support for supporting the lens support for rotation relative to the adapter plate, and a threaded locking pin engaging the lens support remotely from the hinge pin for engaging the slot and allowing the lens support to move into and out of the slot and locking the lens support therein by threading the locking pin.

18. The apparatus of claim 11 further comprising:
   a cam lock adapted to engage the pan base, said cam lock including an inflatable bladder lock extending therefrom and an adjustable alignment pin in parallel relationship with the inflatable bladder lock being in adjustable spaced relation therewith; and
   means for locking the adjustable alignment pin in position with respect to the inflatable bladder lock at a desired distance therebetween.

19. The apparatus of claim 11 wherein the inflatable bladder lock is adapted to be located in a tube and said bladder lock has a central opening therein and further comprising a bladder secured thereto in flow communication with the central opening, and an air valve coupled to a source of air in flow communication with the central aperture for regulating the flow of air to the bladder, the bladder expanding upon introduction of air for engagement with the tube for securing the cam lock in position.

* * * * *